United States Patent [19]

Brude

[11] 3,864,857

[45] Feb. 11, 1975

[54] TELEPHONE NUMBER RECORDED AND REMINDER

[76] Inventor: Berton H. Brude, Rt. 1, Mankato, Minn. 56001

[22] Filed: Oct. 29, 1973

[21] Appl. No.: 410,792

[52] U.S. Cl. .................................................. 40/77.4
[51] Int. Cl. ............................................ G09f 11/02
[58] Field of Search ........... 40/77.4, 77.6, 114, 336, 40/339

[56] References Cited

UNITED STATES PATENTS

| | | | |
|---|---|---|---|
| 1,235,924 | 8/1917 | Read | 40/77.6 |
| 2,150,525 | 3/1939 | Stutz | 40/77.4 |
| 2,874,672 | 2/1954 | Hamm, Jr. | 40/77.4 X |
| 3,156,057 | 11/1964 | Cooper | 40/77.6 |
| 3,343,291 | 9/1967 | Levang et al. | 40/336 X |

*Primary Examiner*—John H. Wolff

[57] ABSTRACT

A telephone number recorder and reminder of small size and simple and inexpensive construction adapted to be mounted on a telephone is provided. A single shaft rotatably supports a plurality of composite wheels with an outer part of each wheel projecting from openings in said housing for positioning numbered indicia on the inner portions of said wheels to a desired alignment with openings in said housing.

3 Claims, 5 Drawing Figures

PATENTED FEB 1 1 1975

3,864,857

TELEPHONE NUMBER RECORDED AND REMINDER

The present invention is directed to a device intended for use in conjunction with a common telephone. Telephones both for home and business use have become one of the most common items of our society. In more recent years, the convenience of the telephone has been enhanced by integration of all of the telephone systems into a direct dialing system, at least throughout the United States and Canada. The numbering for such a direct dialing system includes a total of 10 individual digits. When placing a long distance call, it is necessary to identify the area code and the seven digit number within that area that designates the point to be called.

Frequently there is a need for making a memorandum of a telephone number of a person calling in during the course of a telephone call. Where paper and pencil are available, one can simply write down the number. When a pencil and paper is not available, the present invention provides a ready means attached on or adjacent to the telephone for recording numbers as they are transmitted without the need for pencil and paper. The numbers can be readily changed from one set to another as required.

Another contemplated use of the present invention is in the placing of emergency numbers or numbers which are to be called back in the immediate future in a position where they are readily referred to by the telephone user. For example, when parents leave their children with a babysitter they may wish to leave either an emergency number where they can be reached or the number of the local police, their doctor and the like so that should an emergency arise, the babysitter doesn't have to refer to some other source for the number. Many other instances where the invention will prove of value will be apparent.

A major consideration in the use of any type of a reminder system in conjunction with the telephone is the need to have both a low cost unit and one which is highly compact. Counter and wall space are ordinarily at a premium and for aesthetic reasons as well as to avoid clutter, many persons do not like to have pencil and paper pads positioned adjacent the telephone.

In accordance with the preferred form of the present invention, a device is provided which permits ready recording of numbers as well as temporary storage thereof in a device which, if desired, can be mounted directly onto the telephone base in a variety of positions and with different types of telephones or which can be mounted adjacent the telephone. While not limited to any specific size, the overall size of the device can conveniently be about 4½ inches in length and approximately 1½ inches in diameter when in the preferred cylindrical form illustrated in the accompanying drawings. All of this is accomplished in accordance with the invention by a very simple yet rugged construction of low cost. The invention will now be described in conjunction with the drawings wherein:

IN THE DRAWINGS

In the several figures, like parts will be given the same numerical designation.

Figure 1:
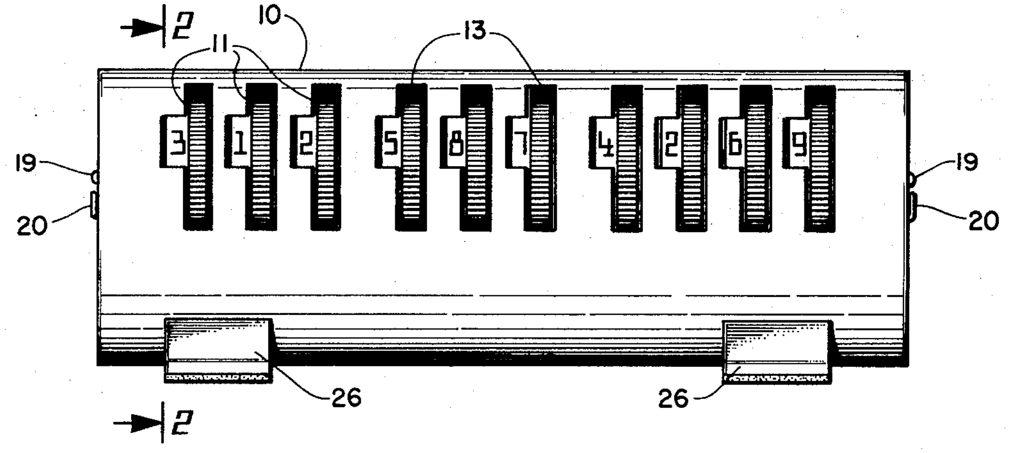
FIG. 1 is a side elevational view of the preferred form of the invention.

Referring now to the drawings, there is illustrated a preferred form of the invention. While the description which follows will be made with respect to the specific showings it should be understood that other configurations than that specifically shown may be made and still utilize the inventive concepts described. In the figures a tubular member 10 which may be either metal or plastic having an overall diameter of about 1½ inches and a relatively thin wall has provided having an overall length of about 4½ inches. At spaced intervals along the length of the tube 10, there has been provided ten openings 11. The openings 11 have an elongated slot portion and narrower generally rectangular opening adjacent thereto. As shown in FIG. 1, it is desirable to space the openings in sets of three openings at the left hand portion of the device which will be utilized as described below for the area code indication, three additional openings immediately to the right thereof spaced to indicate the first three digits of the local telephone number and finally, four openings for the last four digits of the number to be recorded.

Figures 2, 3:
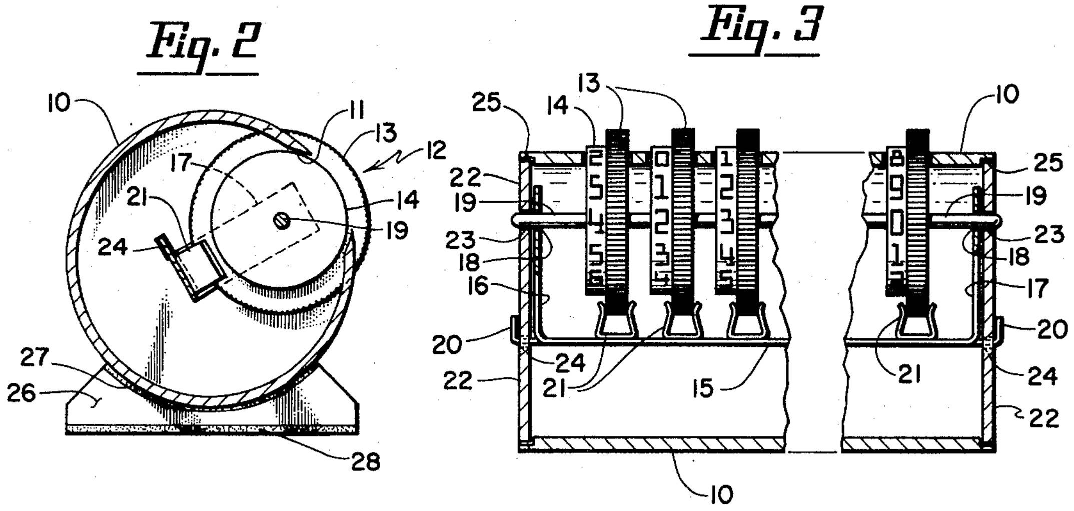
FIG. 2 is a cross sectional view along the lines 2—2 of FIG. 1.
FIG. 3 is a cut-away view with the forward portion of the housing of FIG. 1 removed showing the internal mounting of the selector and indicator wheels.
Figure 4:
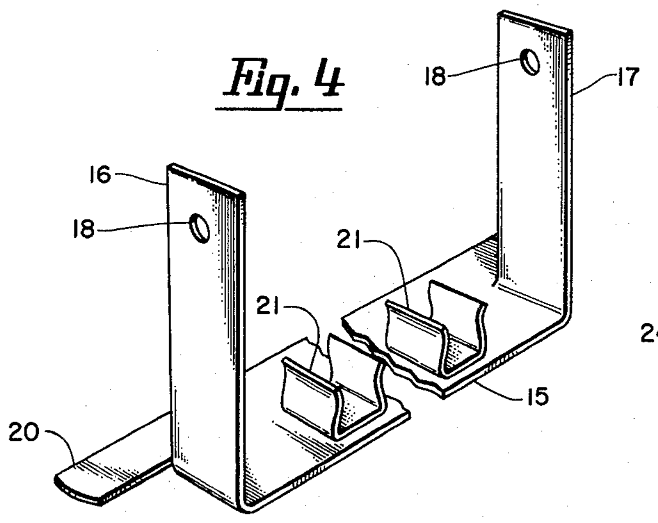
FIG. 4 is a perspective view of a shaft mounting bracket of the device of FIG. 1.
Figure 5:
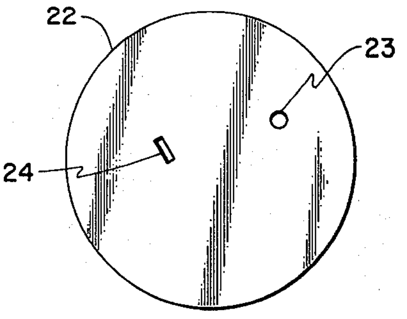
FIG. 5 is an end elevational view of an end plate for the cylinder of FIG. 1.

Each of the openings 11 has positioned in cooperating relationship therewith a composite wheel generally designated 12 which consists of an integral first wheel portion 13 and a smaller wheel portion 14. That is, the diameters of the two portions of the unitary wheel are different from one another for reasons which will be described. The outer portion of 13 may be knurled to aid in its use. The outer portion 14 has numbered indicia positioned at spaced intervals about the circumference thereof as seen in FIGS. 1 and 3.

15 designates a mounting bracket having a pair of upstanding arm portions 16 and 17 with shaft supporting openings 18 through the upper portion thereof. A tab 20 extends outwardly beyond arms 16 and 17 from each end of the bracket 15. At spaced intervals along the base of the bracket 15 there is provided spring clips 21 having an opening between the arms thereof of a size to loosely grip the sides of portion 13 of the wheels in a manner best seen in FIG. 3. The positioning of clips 21 is in accordance with the position of slots 11 in tube 10.

Wheels 12 are positioned so as to have the sides of portion 13 gripped by clips 21 and be in alignment with one another. A shaft 19 is extended through one end of the bracket arm 16 and through the central bore in wheels 12 and then through the opposite opening 18 of bracket arm 17. This assembly with the wheels now appropriately spaced and mounted for rotation on shaft 19 is inserted into tube 10 and pressed upwardly so that a segment of part 13 of the wheels projects through slot 11 at the elongated portion thereof.

End discs 22 having an opening 23 adapted to receive the end of shaft 19 and having an elongated slot 24 for receiving tab 20 is then slipped on to the end of shaft 19 and likewise engages tab 20. A similar disc is positioned at the opposite end of tube 10. Tabs 20 are then bent over as seen in FIG. 3 to hold the assembly in fixed relationship. As can be seen in FIG. 3, tube 10 is provided with a shoulder portion 25 which restrains disc 22 from passing too far into the interior of tube 10. Alternatively, the arm portions 16 and 17 of bracket 15 can provide a restrain against interior movement of disc 22.

As a means of mounting the assembly, there is provided a pair of base members 26. These base members are shaped to have a curved portion which is of a diameter to receive tube 10. The members 26 may be permanently joined to the outside of disc 10 by means such as a permanent adhesive or they may be provided with an adhesive of the type that allows repositioning of base members 26 in accordance with the orientation desired by the user of the indicating portion of the device. For such purposes a non-curing adhesive 27 can be positioned in the arcuate segments of 26 so that the disc 10 will be relatively fixedly held but can be positioned as desired to provide the orientation appropriate to the mounting of the overall device. The flat portion of members 26 may also be provided with a similar adhesive 28 which is protected by a removable nonstick strip until it is desired to mount the assembly. Thus, the unit can be mounted to a telephone base in any orientation desired and can be removed and repositioned as needed.

Operation of the invention should now be apparent. When it is desired to place a number on the device, either for later use by someone such as the babysitter, or to record an incoming number from a telephone caller, the user engages the outer portion 13 of the wheels consecutively and rotates them so that the inner portion 14 having the numerical designation thereon is indexed in accordance with the number desired. As shown in FIG. 1, the first wheel on the left hand side has been rotated so that the number 3 appeared in the rectangular window portion of opening 11. It will be seen that the diameter of that portion of wheel 12 carrying the numerical indicia is immediately adjacent the small part of opening 11 so as to be readily readable. The larger diameter portion permits movement of the wheel through several numbers at one motion thus minimizing the time involved in rotating the wheel 12 to display the desired number. Spring clip 21 acts not only to position the wheels 12 in alignment with slots 11 but also acts as a restraining means to hold the wheels individually at the desired setting when an individual wheel is adjusted. The two point mounting of bracket 15 by means of tabs 20 and the shaft 19 extending through holes 18 and 23 prevents rotation of the bracket. As each of the wheels is rotatably mounted on shaft 19 and as each of them is restrained by spring clip 21, there is no tendency to rotate any wheel other than that wheel specifically engaged at the outer perimeter of portion 13.

As an aid to the user of the invention, it is contemplated that the area code numbers would be desirably of a different coloring than that of the indicating surface of the local telephone number. This would simplify the reading of the numbers. Alternatively when only local numbers are to be recorded one can provide for a blank space on surface 14 on the area code portion on the device.

What is claimed is:

1. A telephone number indicating device adapted to be mounted to a telephone base comprising:

a. an elongated tubular housing including an elongated surface, said housing defining a plurality of openings in alignment with one another along the longitudinal length of said surface;

b. a shaft supported in said housing by means whereby it is held in parallel alignment with said openings;

c. U shaped bracket means having an elongated base portion, the opposed facing arms of said bracket defining openings for receiving said shaft;

d. a plurality of independently rotatable wheels mounted on said shaft, each of said wheels having integral first and second cylindrical portions with a common axis, said first wheel portion having a larger diameter than said second portion, the peripheral surface portion of each of said second portions of said wheels having number indicia thereon sequentially arranged about the circumference thereof;

e. U shaped spring members spaced along and mounted to the base portion of said U shaped bracket at intervals corresponding to the openings in the tubular housing surface, respectively, the opposed arm portions of each of said spring members being so shaped as to matingly engage, slidably and frictionally the opposite sides of respective rotatable wheel first portion to hold same in alignment with said openings, respectively, and against free rotation;

f. closure members for the ends of said tubular housing, said closure members defining shaft receiving openings positioned so that when the shaft is mounted therein and interior to said housing the first wheel portion of each of said wheels projects beyond its respective openings in said housing and said numbered indicia on the second portion of each said wheels is visible through their respective openings; and g. means for restraining said U shaped bracket from rotating about said shaft when one of said wheels is rotated by an operator.

2. A device in accordance with claim 1 wherein said tubular housing is a cylinder.

3. A device in accordance with claim 2 wherein the means for restraining rotation of said U shaped bracket is projections extending outwardly from the ends of said bracket base through openings in said closure members.

* * * * *